United States Patent [19]
Kleinberg et al.

[11] Patent Number: 5,884,305
[45] Date of Patent: Mar. 16, 1999

[54] SYSTEM AND METHOD FOR DATA MINING FROM RELATIONAL DATA BY SIEVING THROUGH ITERATED RELATIONAL REINFORCEMENT

[75] Inventors: Jon Michael Kleinberg, Los Gatos; Prabhakar Raghavan, Saratoga, both of Calif.

[73] Assignee: International Business Machines Corporation, Armonk, N.Y.

[21] Appl. No.: 874,381

[22] Filed: Jun. 13, 1997

[51] Int. Cl.$^6$ ................................................. G06F 17/30
[52] U.S. Cl. ........................................ 707/6; 707/1; 707/5
[58] Field of Search ................... 707/7, 6, 1, 5

[56] References Cited

U.S. PATENT DOCUMENTS

| | | | |
|---|---|---|---|
| 5,257,185 | 10/1993 | Farley et al. | 364/419.19 |
| 5,446,891 | 8/1995 | Kaplan et al. | 395/600 |
| 5,615,341 | 3/1997 | Agrawal et al. | 395/210 |

FOREIGN PATENT DOCUMENTS

| | | | |
|---|---|---|---|
| 63-228221 | 9/1988 | Japan | G06F 7/28 |

OTHER PUBLICATIONS

H. C. Arents et al., "Concept–based Retrieval of Hypermedia Information: From Term Indexing to Semantic Hyperindexing", *Information Processing & Management*, vol. 29, No. 3, 1993, pp. 373–386.

R. Agrawal et al., "Mining Association Rules Between Sets of Items in Large Databases", *Proceedings of ACM–SIGMOD*, Washington, DC, May 1993, pp. 207–216.

R. Agrawal et al., "Database Mining: A Performance Perspective", *IEEE Transactions on Knowledge and Data Engineering*, vol. 5, No. 6, Dec. 1993, pp. 914–925.

R. Agrawal et al., "Fast Algorithms for Mining Association Rules", *Proceedings of the 20th International Conference on Very Large Data Bases*, Santiago, Chile, 1994, pp. 487–499.

R. Agrawal et al., "Mining Sequential Patterns", *IEEE*, 1995, pp. 3–14.

R. Agrawal et al., "Querying Shapes of Histories", *Proceedings of the 21st International Conference on Very Large Data Bases*, Zurich, Switzerland, 1995.

N. Beckmann et al., "The R*–tree: An Efficient and Robust Access Method for Points and Rectangles$^+$", *Communications of the ACM,* 1990, pp. 322–331.

J. Bichteler et al., "Document Retrieval by Means of an Automatic Classification Algorithm for Citations", *Information Storage Retrieval,* vol. 10, 1974, pp. 267–278.

M. E. Frisse, "Searching for Information in a Hypertext Medical Handbook", *Communications of the ACM,* vol. 31, No. 7, Jul. 1988, pp. 880–886.

G. H. Golub et al., "Matrix Computations: Orthogonalization and Least Squares", *The Johns Hopkins University Press,* 1989, pp. 218–219, 351–354.

J. Han et al., "Discovery of Multiple–level Association Rules from Large Databases", *Proceedings of the 21st International Conference on Very Large Data Bases*, Zurich Switzerland, 1995, pp. 420–431.

M. Houtsma et al, "Set–oriented Mining for Association Rules", *IBM Research Report,* RJ9567, Oct. 22, 1993.

(List continued on next page.)

*Primary Examiner*—Thomas G. Black
*Assistant Examiner*—Frantz Coby
*Attorney, Agent, or Firm*—James C. Pintner; Khanh Q. Tran

[57] ABSTRACT

A system and method are provided for performing the process known as "data mining" on a database of raw data records having common data elements, to obtain categorical cluster rules as to what elements of the data tend to occur in common in multiple records. Initial values are assigned to the elements. In an iterative process, the associated value for each given one of the elements is recalculated based on the values of other elements which occur in records together with the given element. Thus, the associated values will tend to grow for elements occurring together in multiple records. Those common occurrences of elements in multiple records represent categorical cluster rules the owner of the data is likely to want to know about. Thus, these rules may be identified based on the growth of the associated values for the records.

45 Claims, 3 Drawing Sheetse

OTHER PUBLICATIONS

T. R. Kochtanek, "Brief Communication: Document Clustering, Using Macro Retrieval Techniques", *Journal of the American Society for Information Science,* vol. 34, No. 5, 1983, pp. 356–359.

F. Narin et al., "Bibliometrics", Chapter 2, *Annual Review of Information Science and Technology,* 1977, pp. 35–58.

R. T. Ng et al., "Efficient and Effective Clustering Methods for Spatial Data Mining", *Proceedings of the 20th International Conference on Very Large Data Bases,* Santiago, Chile, 1994, pp. 144–155.

J. S. Park et al., "An Effective Hash–based Algorithm for Mining Association Rules", *SIGMOD,* San Jose, California, 1995, pp. 175–186.

G. Platetsky–Shapiro, "Discovery, Analysis, and Presentation of Strong Rules", Chapter 13, *GTE Laboratories Incorporated,* pp. 229–248, no date.

R. Rada et al., "Retrieval Hierarchies in Hypertext", *Information Processing & Management,* vol. 29, No. 3, 1993, pp. 359–371.

E. Rivlin et al., "Navigating in Hyperspace: Designing a Structure–based Toolbox", *Communications of the ACM,* vol. 37, No. 2, Feb. 1994, pp. 87–96.

A. Savasere et al., "An Efficient Algorithm for Mining Association Rules in Large Databases", *Proceedings of the 21st International Conference on Very Large Data Bases,* Zurich, Switzerland, 1995, pp. 432–444.

W. M. Shaw, Jr., "Subject Indexing and Citation Indexing—Part II: an Evaluation and Comparison", *Information Processing & Management,* vol. 26, No. 6, 1990, pp. 705–718.

W. M. Shaw, Jr., "Subject and Citation Indexing—Part I: The Clustering Structure of Composite Representations in the Cystic Fibrosis Document Collection", *Journal of the American Society for Information Science,* vol. 42, No. 9, 1991, pp. 669–675.

W. M. Shaw, Jr., "Subject and Citation Indexing—Part II: The Optimal, Cluster–based Retrieval Performance of Composite Representations", *Journal of the American Society for Information Science,* vol. 42, No. 9, 1991, pp. 676–684.

R. W. Schwanke et al., "Cross References are Features", Machine Learning: From Theory to Applications, *Springer–Verläg,* pp. 107–123, no date.

D. A. Spielman et al., "Spectral Partitioning Works: Planar Graphs and Finite Element Meshes", Based on *UC Berkeley Technical Report UCB//CSD–96–898,* no date.

R. Srikant et al., "Mining Generalized Association Rules", *Proceedings of the 21st International Conference on Very Large Data Bases,* Zurich, Switzerland, 1995, pp. 407–419.

R. Weiss et al., "HyPursuit: A Hierarchial Network Search Engine that Exploits Content–link Hypertext Clustering", *MIT Laboratory for Computer Science,* no date.

|  | COLUMN C(1) | COLUMN C(2) | COLUMN C(3) |
| --- | --- | --- | --- |
| RELATION 1 | JANUARY 12 | CHICAGO | NEWARK |
| RELATION 2 | JANUARY 17 | BOSTON | SAN JOSE |
| RELATION 3 | MARCH 11 | BOSTON | DALLAS |

*FIG. 1*

INITIALIZED STATE

AFTER FIRST ITERATION

AFTER SECOND ITERATION

SYSTEM AND METHOD FOR DATA MINING FROM RELATIONAL DATA BY SIEVING THROUGH ITERATED RELATIONAL REINFORCEMENT

FIELD OF THE INVENTION

The invention generally relates to the field of data mining. More specifically, the invention relates to the determination of "categorical clusters" from within a body of data, the categorical clusters providing information about elements in common between different data records, the information being of use to the owner/user of the data.

BACKGROUND OF THE INVENTION

In recent years, the field of data mining, or extracting useful information from bodies of accumulated raw data, has provided a fertile new frontier for database and software technologies. While numerous types of data may make use of data mining technology, a few particularly illuminating examples have been those of (i) mining information, useful to retail merchants, from databases of customer sales transactions, and (ii) mining information from databases of commercial passenger airline travel. In the description that follows, these examples will be used illustratively.

Customer purchasing patterns over time can provide invaluable marketing information for a wide variety of applications. For example, retailers can create more effective store displays, and can more effectively control inventory, than otherwise would be possible, if they know that, given a consumer's purchase of a first set of items, the same consumer can be expected, with some degree of probability, to purchase a particular second set of items along with the first set. In other words, it would be helpful from a marketing standpoint to know association rules between itemsets (different products) in a transaction (a customer shopping transaction).

To illustrate, it would be helpful for a retailer of automotive parts and supplies to be aware of an association rule expressing the fact that 90% of the consumers who purchase automobile batteries and battery cables also purchase battery post brushes and battery post cleanser. (In the terminology of the data mining field, the latter are referred to as the "consequent.")

It will be appreciated that advertisers, too, can benefit from a thorough knowledge of such consumer purchasing tendencies. Still further, catalogue companies can conduct more effective mass mailings if they know the tendencies of consumers to purchase particular sets of items with other sets of items.

It is to be understood, however, that although this discussion focusses on the marketing applications of the present invention, database mining and, hence, the principles of the present invention, are useful in many other areas, e.g., business and science.

It happens that until recently, it was highly impracticable to build large, detailed databases that could chronicle thousands, and from a statistical view preferably millions, of consumer transactions. Deriving useful information from the databases (i.e., mining the databases), was even more impractical.

Consequently, marketing and advertising strategies have been based upon anecdotal evidence of purchasing patterns, if any at all, and thus have been susceptible to inefficiencies in consumer targeting that have been difficult, if not impossible, to overcome.

With the advent of modern technology, however, building large databases of consumer transactions has become possible. The ubiquitous bar-code reader can almost instantaneously read so-called basket data, i.e., when a particular item from a particular lot was purchased by a consumer, how many items the consumer purchased, and so on, for automatic electronic storage of the basket data.

Further, when the purchase is made with, for example, a credit card, the identity of the purchaser can be almost instantaneously known, recorded, and stored along with the basket data.

Still further, vastly improved data storage media have made it possible to electronically store vast amounts of such information for future use.

As alluded to above, however, building a transaction database is only part of the marketing challenge. Another important part is the mining of the database for useful information. Such database mining becomes increasingly problematic as the size of databases expands into the gigabyte, and indeed the terabyte, range.

Much work, in the data mining field, as gone to the task of finding patterns of measurable levels of consistency or predictability, in the accumulated data. For instance, where the data documents retail customer purchase transactions, purchasing tendencies, and, hence, particular regimes of data mining, can be classified many ways.

One type of purchasing tendency has been called an "association rule."

In a conventional data mining system, working on a database of supermarket customer purchase records, there might be an association rule that, to a given percent certainty, a customer buying a first product (say, Brie cheese) will also buy a second product (say, Chardonnay wine). It thus may generally be stated that a conventional association rule states a condition precedent (purchase of the first product) and a condition subsequent or "consequent" (purchase of the second product), and declares that, with, say 80% certainty, if the condition precedent is satisfied, the consequent will be satisfied, also.

Methods for mining transaction databases to discover association rules have been disclosed in Agrawal et al., "Mining Association Rules Between Sets of Items in Large Databases", *Proc. of the ACM SigMod Conf. on Management of Data*, May 1993, pp. 207–216, and in Houtsma et al., "Set-Oriented Mining of Association Rules", *IBM Research Report RJ 9567*, October, 1993.

Early data mining approaches have had various drawbacks, which presented challenged for data mining pioneers to overcome. One such drawback was the requirement of excessive memory and of multiple data sorts and/or passes attributable to generating candidate itemsets of interest on-the-fly, that is during a pass over the data, which resulted in unduly prolonged processing time. Further, prior methods had not specifically addressed database structure or buffer management problems. Moreover, prior methods were incapable of discovering association rules having more than a single item in the consequent (the right-hand side of a rule), and accordingly were limited in their ability to discover useful association rules.

These and other data mining objectives have been addressed in Agrawal et al., U.S. Pat. No. 5,615,341, "System and Method for Mining Generalized Association Rules in Databases," and in co-pending, co-assigned U.S. patent applications Ser. No. 08/415,006, filed Mar. 31, 1995 now U.S. Pat. No. 5,796,209, Ser. No. 08/500,717, filed Jul. 11, 1995, Ser. No. 08/577,945 now U.S. Pat. No. 5,724,573, filed Dec. 22, 1995, and Ser. No. 08/735,911, filed Oct. 25, 1996 based on a foreign priority date of Oct. 26, 1995 now U.S. Pat. No. 5,812,997.

However, association rules have been limited in scope, in the sense that the conditions precedent and subsequent fall within the same column or field of the database. In the above example, for instance, cheese and wine both fall within the category of supermarket items purchased.

The field remains ripe for new, creative approaches to data mining, to further assist data system users to extract useful information from their accumulated data.

SUMMARY OF THE INVENTION

It is therefore an object of the invention to provide a new and useful approach to data mining.

It is a further object of the invention to provide enhanced efficiency in the process of mining useful information from bodies of accumulated raw data.

Another object of the present invention to provide a system and method for quickly mining large databases.

Another object of the present invention is to provide a system and method for discovering rules, which would be useful to merchants or other data owners, in itemsets that are stored in a transaction database.

Another object of the invention is to provide a system and method for discovering categorical clusters of information, providing information which goes beyond conventional association rules to cover multi-category data in records having a multiple column format, in itemsets that are stored in a transaction database.

Still another object of the present invention is to provide a system and method for rapidly finding rules in itemsets which repeat with a user-defined degree of regularity, and which satisfy a user-defined degree of confidence.

Yet another object of the present invention is to provide a system and method for quickly mining large databases which is easy to use and cost-effective.

To achieve these and other objects, there is provided, in accordance with the invention, a system and method for extracting highly correlated elements (a "categorical cluster") from a body of data. It is generally understood that the data includes a plurality of records, the records contain elements from among a set of common fields, the elements have respective values, and some of the values are common to different ones of the records.

The method of the invention comprises the following steps:

First, in an initialization step, for each of the elements in the records, an associated value, having an initial value, is assigned.

Then, a computation is performed, to update the associated values based on the associated values of other elements. Preferably, the computation is done a plurality of times, iteratively, each iteration using the values resulting from the previous iteration (or, optionally, also using values from earlier iterations) to produce the next set of updated values.

After the computation is completed, or after all the desired iterations are completed, the final results, i.e., the updated associated values, are used to derive a categorical cluster rule. The categorical cluster rule provides the owner of the data with advantageously useful information from the data.

Accordingly, the invention provides (i) a new and useful form of information to be derived from an initial body of data, and (ii) a new and useful approach to obtaining that information from the raw data.

While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

BRIEF DESCRIPTION OF THE DRAWINGS

FIG. 1 is a table, representing a relational database of airline flights, for use in illustrating principles relating to the invention.

DESCRIPTION OF THE PREFERRED EMBODIMENT

Figure 2:
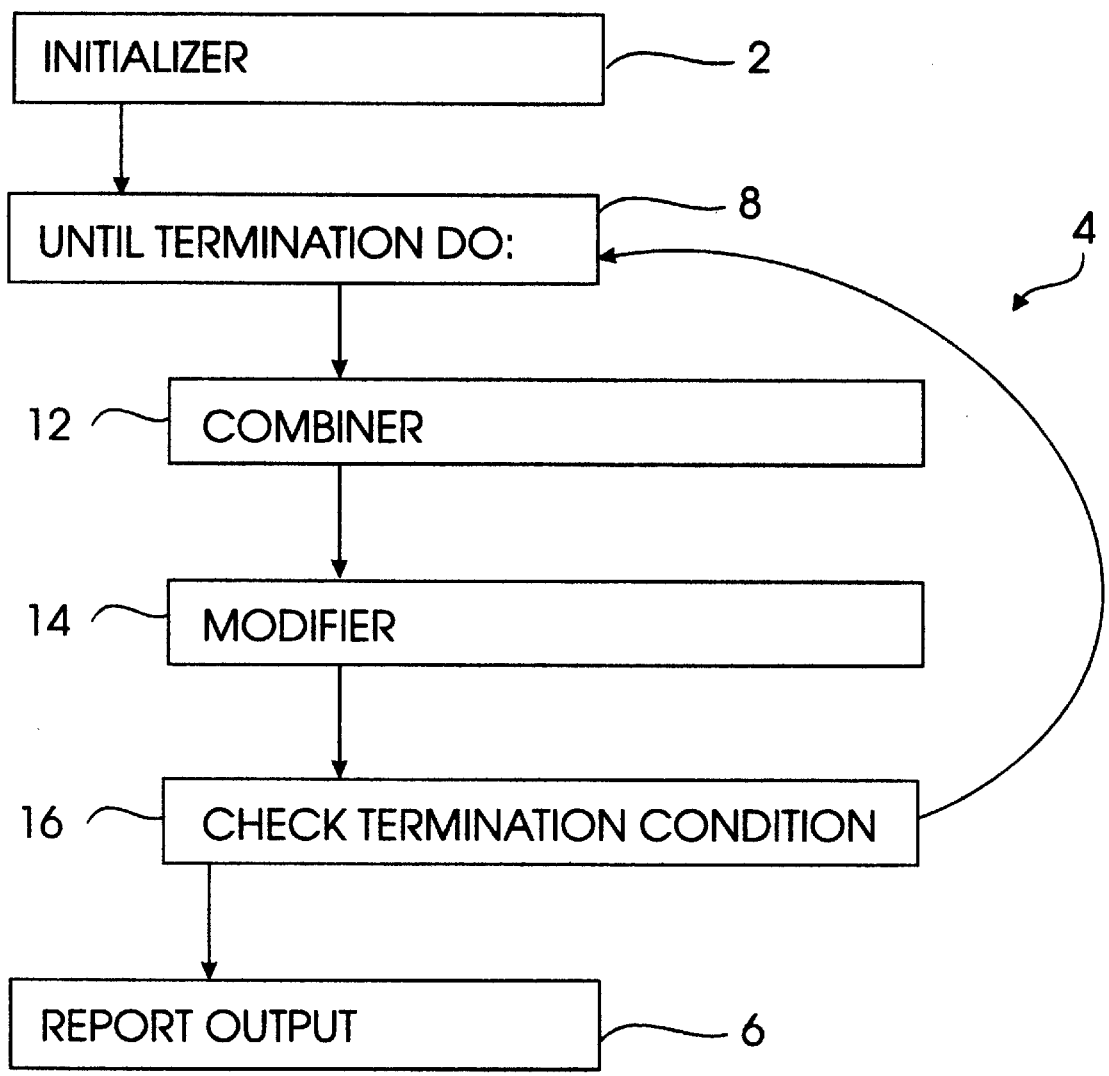
FIG. 2 is a flowchart showing the method of the invention.

The present invention provides a new and useful approach to data mining, based on ideas set forth in co-pending, co-assigned U.S. patent application Ser. No. 08/813,749, filed Mar. 7, 1997 now pending. In that invention, a system and method were provided for searching for desired items from a network of information resources. In particular, the system and method were described as having advantageous applicability to searching for World Wide Web pages having desired content.

The Ser. No. 08/813,749 invention worked as follows: An initial set of pages was selected, preferably by running a conventional keyword-based query, and then further selecting pages pointing to, or pointed to from, the pages found by the keyword-based query. Alternatively, that invention was applicable to a single page, where the initial set includes pages pointed to by the single page and pages which point to the single page. Then, iteratively, authoritativeness values were computed for the pages of the initial set, based on the number of links to and from the pages. One or more communities, or "neighborhoods", of related pages were defined based on the authoritativeness values thus produced. Such communities of pages would then be likely to be of particular interest and value to the user who is interested in the keyword-based query or the single page.

The subject of the present invention is the mining of patterns from a table of records, such as a relational database. Limitations of conventional association rules have been discussed above.

A more generalized relation, termed here a "categorical cluster," covers multiple columns or fields of data records. For instance, assume that, in the above example, data records were kept, say, by a credit card company, of customer purchases at multiple retail outlets. Then, there might be a rule that, within a percent confidence, a customer who buys Brie cheese at a Trader Joe's gourmet food outlet will, on the same day, also buy Chardonnay wine at a Safeway supermarket. Such a relation covers two different columns, that of the item purchased, and that of the seller, as well as the common date.

The present invention concerns itself with such categorical clusters.

For further illustrative purposes, reference is made to FIG. 1, which shows a database of airline flights, in table form. FIG. 1 shows three fields listing flights taken by a number of individuals. In database terminology, fields are also referred to as "columns."

Each row (also referred to as a "record" in the parlance of relational databases) details one flight taken by one individual. The record contains an entry in the first field C(1) specifying the date of travel, an entry in the second field C(2) indicating the departure airport, and an entry in the third field C(3) indicating the destination airport.

For simplicity, only three relations are shown, and no two of them are identical. However, it will be understood that a database of such flight information will include a large number of combinations of such departure and destination airports, and numerous entries for different individuals who made such flights on various dates.

The table of FIG. 1 will be used to illustrate a difference between conventional association rules and the "categorical clusters" which make up a noteworthy aspect of the invention.

The invention gives a method for eliciting, or "mining," patterns latent in such tables. An example of such a pattern might be the following: "There is a concentration of people flying from Boston to Dublin in the month of March."

The method applies to any such table of records, with an arbitrary number of fields. The method of the invention will now be described, using a generalized approach in which algorithmic concepts are expressed in a form applicable for any database, including any number of records.

Suppose that, in a relational database, there are k fields, labeled $C(1), C(2), \ldots C(k)$. Each field is simply a set, with an associated category—e.g., people, places, items, stores, etc. The elements of the set in a field are considered to belong to the associated category. Note that fields may have elements in common, and may even have the same associated category. Thus, in the example of FIG. 1, C(1) was a set of dates, and C(2) and C(3) were sets of airports.

In the discussion which follows, an element will be referred to by the pair (i,j); this means the j-th element from the set associated with field i.

A record is typically a k-tuple, consisting of one element from each field. Note that an element from a field may appear in several records. A table, such as the exemplary table in FIG. 1, is then a set of records.

Occasionally, a row may omit a field altogether (in practice, typically because of lost or incomplete data). It will be shown below how the method of the invention can be adapted to this case.

In accordance with the invention, a table is mined by iterated relation reinforcement. From an initialized state, a succession of iterations, counted ordinally, is performed. In the discussion which follows, the variable t will be used to denote the t-th iteration.

For each category i and for each element j (where i ranges from 1 to k, and where j ranges from 1 to the number of distinct elements in field i), a quantity $x(i,j,t)$ is associated therewith. The quantities x will be referred to herein as "associated values," since a respective value will be associated with each respective one of the elements.

The $x(i,j,t)$ values may be thought of as corresponding with a strength of membership of the element in a categorical cluster being computed by the iterations. As will be seen, the iterations cause the associated values to grow in value for those elements in records that have elements in common with other records, i.e., for those elements in records that are to be determined as being within a categorical cluster.

The quantities x are assigned initial values, preceding the first iteration. Each iteration modifies their values as per the calculation performed by the iteration. For instance, $x(i,j,2)$, which had been produced by the second iteration, is modified by the third iteration to produce $x(i,j,3)$. More generally, the particular technique for computing $x(i,j,3)$ may also use x values earlier than $x(i,j,2)$. The quantities x may, in general, be non-integral, but are shown as integral for the present illustration.

FIG. 2 is a flowchart showing the flow of the computation. Generally, there is performed an initialization 2, a sequence of iterations shown generally as 4, and an output 6 of the final result.

Note that, in the discussion which follows, the blocks of the flowchart of FIG. 2 will be referred to interchangeably as either a method step or as means for executing the method step. For instance, the block 2 will be referred to either as an initialization step, or as an initializer. It will be understood that the invention may be embodied either as a method made up of method steps, or as an apparatus comprising means for performing such functions. It is believed that those persons skilled in this art will not have difficulty understanding the substance of this description.

INITIALIZATION

The INITIALIZER 2 assigns an initial value to each of the quantities $x(i,j,0)$. This assignment is arbitrary, and may be done in any manner suitable to a user's particular circumstances. However, three preferred embodiments for initializing the x values will be given. Each of these embodiments yields distinct and interesting consequences for applications. After the general description of the method has been completed, these embodiments will be expanded upon.

Summaries of the three preferred embodiments are as follows:

1. UNIFORM INITIALIZER: This INITIALIZER assigns to each $x(i,j,t)$ the same value (say 1).
2. RANDOM INITIALIZER: The $x(i,j,t)$ quantities are assigned initial values drawn from a probability distribution. For instance, each $x(i,j,t)$ may be independently assigned a value that is uniform in the interval 0 to N for some number N. It should be stressed though that the method does not hinge specifically on either the independent assignments or the uniform distribution in some interval.
3. LOCAL INITIALIZER: A subset of the $x(i,j,t)$ is chosen, either by a user or by an application control program, and the x quantities of the subset are assigned values from one probability distribution, such as that given for the second preferred initialization. The initial values for the remaining x quantities are drawn from a second probability distribution. In a further preferred embodiment, the second distribution sets all of the remaining x quantities to a fixed value, say, zero.

ITERATIONS

Next, a sequence of iterations 4 are performed. The iterations perform a function comparable to that given in the above-described co-pending patent application Ser. No. 08/813,749, to provide a set of x values from which the desired categorical clusters are derived. In general, the greater the x values produced, the more clearly defined is the categorical cluster, and the stronger is the rule based thereon.

The x values may be normalized, preferably after each iteration.

The iteration 4 is described in terms of a loop, which skilled programmers will know how to implement in terms of FOR a given number of iterations, WHILE a given condition holds, UNTIL a given condition is reached, etc., whichever is suitable to the user's application. The loop is shown, in the present example, in terms of an UNTIL block 8 and a check block 10, where, after the iteration, the terminating condition is checked for.

Within each iteration, say, the t-th iteration, calculations are performed to produce the values $x(i,j,t)$ for each of the terms $i,j$ of the database.

A preferred method for performing the iterations 4 will now be described.

COMBINER

An iteration begins with a step 12 of combining. The COMBINER 12 is a module that updates the values of the $x(i,j,t)$, preferably by combining values of $x(p,q,t')$ for some or all values of $p$, $q$ and $t'<=t$:

In general, the preferred combiner 12 uses a function f which takes: (1) the current iteration number t; (2) the element $(i,j)$ whose value is being updated at time t; and (3) a collection of subsets S of the values $x(p,q,t')$ for $t'<=t$. The value $x(i,j,t)$ is then updated by combining (adding in the preferred embodiment) the values of the function f evaluated on all subsets S.

Two preferred embodiments for the COMBINER 12 are as follows:

1. The first preferred embodiment employs two intermediate values, which are termed the "additive weight" and the "additive i-weight." The additive weight of a single record R at time t is the sum of the values $x(k,j,t-1)$ for all elements that occur in R. The additive i-weight is the same as the additive weight, except that the sum is taken over all elements except for the one in field i.

Then, the COMBINER 12 computes $x(i,j,t)$ as the sum of the additive i-weights of all records containing element $(i,j)$. A simple extension of this combiner would be to weight the fields differently in the sum. That is, in the introductory example, more emphasis could be given to the departure city than to the arrival city.

2. In the second preferred embodiment, there are also employed two intermediate values, which in this case are termed the "multiplicative weight" and the "multiplicative i-weight." The multiplicative weight of a single record R at time t is the product of the values $x(k,j,t)$ for all elements that occur in R. The multiplicative i-weight is the same as the multiplicative weight, except that the product is taken over all elements except for the one in field i. The COMBINER 12 computes $x(i,j,t)$ as the sum of the multiplicative i-weights of all records containing element $(i,j)$.

Preferably, the COMBINER 12 includes the capability of handling a situation in which data is missing or incomplete.

For each record in which an element (say, from the column j) is missing, the COMBINER 12 introduces a unique pseudo-element. Preferably, the value associated with the pseudo-element is not computed by the usual COMBINER rule, but is instead computed by a special function, herein designated as "g."

Let $S=\{a,b,c\ldots\}$ be the set of elements in the record with the missing element in column j. Let R1, R2, R3 ... be a list of all records containing any of the elements in S. Denote the element in column j of R1 as "R1j," denote the element in column j of R2 as "R2j," and so on.

Then, the value associated with the pseudo-element is the function g applied to the values associated with R1j, R2j, R3j ...

Two preferred embodiments for the function g are as follows:

1. g computes the arithmetic mean of the values associated with R1j, R2j, R3j ...
2. g computes the geometric mean of the values associated with R1j, R2j, R3j ...

MODIFIER

The MODIFIER 14 is a module that is invoked after each invocation of the COMBINER. It serves to modify the $x(i,j)$ values for elements that are selected, either by a user or by an application control program. The purpose of this modification is, in general, to focus the clustering operation on a particular set of elements that are of interest to the user, or to suppress the influence of certain elements that the user wishes to exclude from the computation.

Two preferred types of modification are the following.

1. A pre-set additive amount $y(i,j,t)$ is added to $x(i,j,t)$. Note that $y(i,j,t)$ can be either positive or negative.
2. $x(i,j,t)$ is multiplied by a pre-set multiplicative amount $z(i,j,t)$. A particular special case of this is where the multiplicative amount $z(i,j,t)=0$. This case is referred to as "masking." Masking forces a particular $x(i,j,t)$ value to be 0 throughout the progress of the algorithm. "Masking has the effect of suppressing all patterns which include the particular element $(i,j)$.

It is also possible to for the MODIFIER to use the current value of one element to modify the current value of another element. Typically, this could be based on a user-supplied notion of similarity between elements, and could insure that elements considered similar by the user retain values close to one another throughout the iterations.

For instance, in a database containing automobile manufacturers, the elements "Nissan" and "Datsun" may be provided separately. ("Datsun" is a trade name formerly used by the Nissan Corporation.) These two elements could be declared similar, and a modification rule could be defined, say, to equate their values after every iteration.

ITERATIONS

Following execution of the steps of combining 12 and modifying 14, an iteration is completed. The algorithm runs in a sequence of iterations, each iteration including an invocation of the COMBINER 12 and an invocation of the MODIFIER 14, preferably the COMBINER 12 followed by the MODIFIER 14.

The algorithm stops execution when a TERMINATION CONDITION 16 is detected. The TERMINATION CONDITION 16 can be simply a counter that stops the algorithm after a fixed number of iterations, or it can be a predicate that determines when a certain property of the sequence of $x(i,j,t)$ values holds. As a salient example of the latter case, the algorithm could stop when the largest several $x(i,j,t)$ values do not change by more than a pre-set amount from one iteration to the next.

OUTPUT

Finally, a set of output values is presented to a user (step 6), indicating the information that has been "mined". As indicated above, a "categorical cluster" comprises a subset of the elements in each field. The purpose of the output step 6 is to produce a representation of such a cluster, in terms of, or derived from, the $x(i,j,t)$ values that have been computed.

The representation of the sets is based on the principle that elements with larger $x(i,j,t)$ values are considered to be more strongly associated with the computed cluster. Also, a quantitative measure of the strength of the association of an element with a cluster may be obtained from the $x(i,j,t)$ values.

The importance of a record in a particular pattern can be reported to the user as a function (preferably, as computed above) of the values $x(i,j,t)$ associated with the elements of the record.

The output information provided by step 6 preferably includes a subset of the x(i,j,t) values, together with a combination of the x(i,j,t) values on a subset of the records. In accordance with the invention, the x(i,j,t) values are used to derive a categorical cluster rule.

As to the type of output information provided, four preferred embodiments of systems according to the invention are the following, where t is taken to be the iteration number at termination:

(1) For a pre-set parameter c, the c elements with the largest x(i,j,t) values in each field are displayed to the user as one cluster.

(2) For a pre-set parameter p, the elements in each column with x(i,j,t) values greater than p are displayed to the user as one cluster.

(3) For a pre-set parameter d, the d records with the largest additive or multiplicative weight are reported to the user, and the elements participating in these relation are displayed to the user as one cluster.

(4) For a pre-set parameter q, the records with additive or multiplicative weight greater than q are reported to the user, and the elements participating in these relation are displayed to the user as one cluster.

More generally, the elements in the cluster may be returned together with their x(i,j,t) values, or in any manner based on their x(i,j,t) values, so as to indicate the strength of their association with the cluster.

Finally, the categorical cluster is identified using the x values. Using one of the above criteria, a subset of the x values is identified, the subset including the values associated with the elements of the records which meet the criterion. Thus, those records are a subset of the records, having elements whose associated values meet a predetermined criterion.

That subset of the records is then provided as an output. The subset is then the desired categorical cluster.

Optionally, a factor, representing a strength of the cluster, may be output along with the categorical cluster. It will be understood that, in general, the greater the difference between the x values within and without the subset of records, the greater the strength of the cluster. Various suitable formulae may be used for computing the strength factor. For instance, the strength factor may be based on a difference between the x values of the elements within and without the subset, a ratio of the values of those x values, or any other suitable measure.

Where a larger set or records leads to a plurality of different x values that do, or do not, satisfy the predetermined criterion, the variance between the values may be figured in by taking an average, taking a weighted average, etc., as part of the strength factor calculation.

EXAMPLE

The following is an example of how an input set of rules, given in terms of a set of fields (i.e., columns) whose elements have various values, is used, by the method of the invention, to produce a final set of x values, from which rules are derived.

Figure 3:
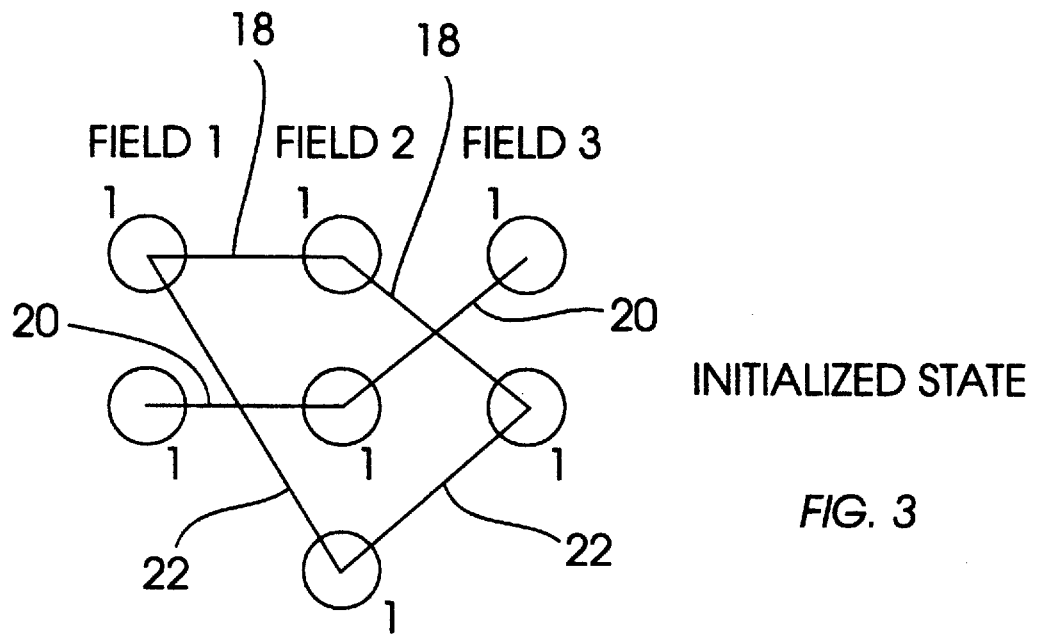
FIGS. 3, 4, and 5 are graphs, based on the data of FIG. 1, showing operation of the flowchart of FIG. 2.
Figure 4:
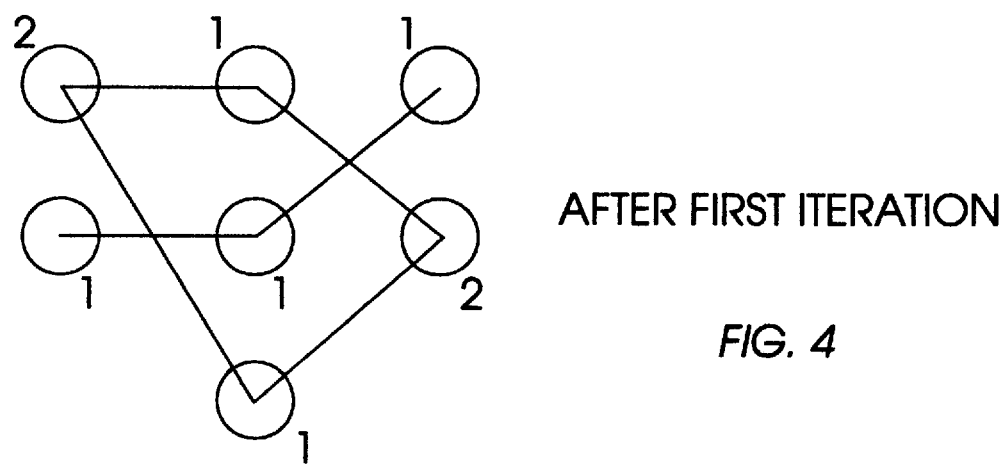
Figure 5:
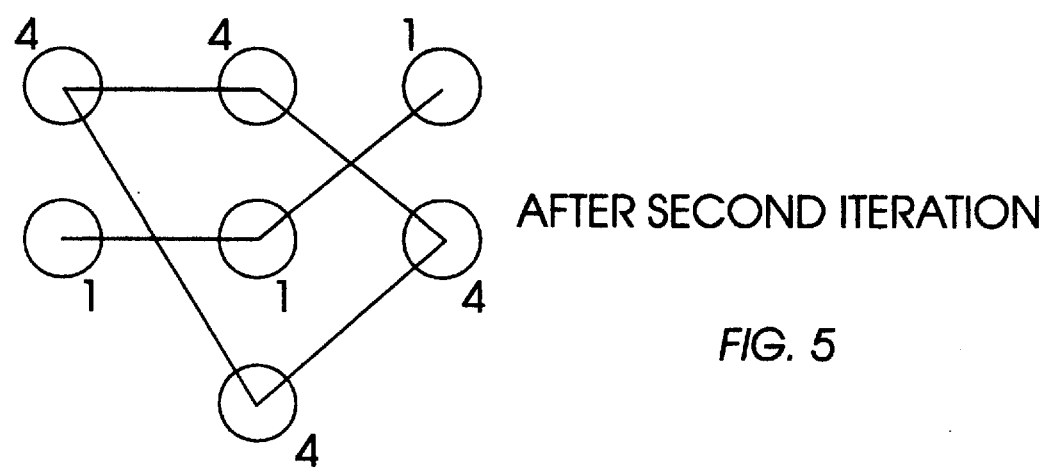

FIGS. 3, 4, and 5 are graphs which, taken together, depict an example of the execution of the initialization and two iterations of a method according to the invention. In particular, the above-described embodiment will be used, in which the initializer 2 assigns a uniform initial weight to all elements, and in which the combiner 12 uses multiplication.

In this example there are three fields. Each field is shown as a column, headed by a legend such as "FIELD 1." Thus, the fields, shown as abstractions in FIGS. 3, 4, and 5, will be understood to be comparable to the three fields, or "columns," in the air travel example of FIG. 1.

Elements of the fields are shown, in abstraction, as circles under the field headings. Each one of the elements represents a distinct value for that field. In the illustrated abstract example, the first and the third fields have two elements while the second field has three elements.

Note, however, that FIGS. 3, 4, and 5 show lists of field elements, rather than a table representation of a database. Horizontal rows of elements do not correspond with database records. Rather, records are shown as interconnecting lines, indicating that a given record has that combination of elements, i.e., values, for the three fields.

There are three records in this example. The three records are designated by reference numbers 18, 20, and 22, which mark the connecting lines which represent each respective one of the records. For instance, the record 18 includes the top elements of fields 1 and 2, and the second element of field 3.

Thus, it will be understood that two elements appear in multiple records. The top element of field 1 and the second elements of field 3 appear in the records 18 and 22. All elements in the record 20 appear uniquely in that record.

Each of the elements shown in FIG. 3 has an x(i,j,0) value associated with it. These values are all shown as 1. They are the uniform weight assigned by the initializer 2.

FIG. 4 shows the result of the first iteration. The x(i,j,1) values for the top element of field 1 and the second element of field 3 have changed from 1 to 2. Because the x(i,j,0) values were all 1, the multiplicative weights and the multiplicative i-weights were all 1. For all elements that appeared in only one record, there was only one weight to sum up, so their x(i,j,1) values remain 1. Thus, all of the x(i,j,1) values for the record 20 have remained 1. For the two elements that appeared in two records, there were two 1-valued weights to sum up, so their x(i,j,0) values become 2, as shown.

FIG. 5 shows the result of the second iteration. The x(i,j,2) values for the record 20 remain 1, for the same reason as given for the first iteration. The x(i,j,2) values for all of the elements of the records 18 and 22 have become 4. For the field 2 elements of those two records, the multiplicative weights and i-weights are 4, and there is only one record's value to sum up. Therefore, their x(i,j,2) values are now 4. For the field 1 and 3 elements of those records, which are common to both records, the multiplicative i-weights are 2 for each of the two records they belong to. The sum of the two 2-valued weights is 4, so the x(i,j,2) values for those two records is also 4.

No normalization is performed in this example. However, normalization as described in co-pending U.S. patent application Ser. No. 08/813,749 may optionally be performed.

It will be seen, then, that the records 18 and 22 have x values which, after only two iterations, outstrip the x values for the record 20. This is intuitively the correct result, since a rule will manifest itself in terms of common patterns in multiple records. If it is assumed, for the moment, that the records of FIGS. 3–5 represent airline flight information, with fields being defined consistently with the column definitions of FIG. 1, then the records 18 and 22 represent two passenger flights on the same date, from two departure cities to the same destination cities. The correlation between the date and the destination may be understood to be the sort of pattern that the owner of the database desires to find out about.

Finally, the categorical cluster is identified using the x values. In the example of FIGS. 3–5, suppose there is a threshold value, falling intermediate between 1 and 4. That threshold value, or "predetermined value," defines a subset of the x values, the subset including the values associated with the elements of the records 18 and 22. Thus, those two records are a subset of the records, having elements whose associated values meet a predetermined criterion of exceeding the predetermined threshold value.

That subset of the records is then provided as an output. The subset is then the desired categorical cluster.

Optionally, a factor, representing a strength of the association, may be output along with the categorical cluster. In this example, the strength factor may be based on a difference between 4 and 1, a ratio of 4:1, or any other suitable measure.

APPLICATIONS

In its most simple form, the method tends to find strongly correlated sets of records (as in the example above) from the population of all correlations latent in the table. Such operations are traditionally known as "data mining". In addition, the invention's ability to initialize the values of the variables allows a user to bias the process in certain directions. By setting only certain elements to have non-zero values, one biases the process towards discovering correlations involving only those elements.

For a concrete example, consider again the table of dates, flight departures and arrivals given in FIG. 1. By assigning non-zero values only to records that involve flights originating from JFK, LaGuardia, or Newark airports, patterns may be discovered which primarily involve the travel of people into or out of the New York City area.

The method of the invention also serves several clustering functions. First, elements of a single field that occur together in a discovered correlation can be considered "similar." This is a type of similarity determined purely by association through records in the database. The technique thereby allows clustering without the use of numerical measures of similarity or proximity.

Secondly, by initializing from many different sets of starting values, it is possible to discover many independent correlations among the elements. Elements that occur in relatively disjoint sets of correlations can be considered to belong to well-separated clusters in the data. Again, this separation is performed without the use of any numerical similarity measure.

In the above discussion of clustering, with reference to the absence of numerical measures, it will be understood that clustering in accordance with the invention is advantageously applicable to objects (e.g., people, stores, products, flights) which do not have numerical interpretations from which a straightforward measure of similarity can be assigned.

For example, in comparing salaries, a person earning $50,000 might be said to be "similar" to one earning $52,000, where similarity is defined in terms of ranges of salaries. Likewise, a 46-year old man might be said to be like a 45 year old man, based on age ranges.

In contrast, it might be said that Newark is "unlike" JFK, based on similarity criteria requiring that airports be within the same state to be similar.

The present invention advantageously allows such comparisons, and allows for the development of such notions of similarity, as per the user's particular needs and interests.

Using the foregoing specification, the invention may be implemented using standard programming and/or engineering techniques using computer programming software, firmware, hardware or any combination or subcombination thereof. Any such resulting program(s), having computer readable program code means, may be embodied or provided within one or more computer readable or usable media such as fixed (hard) drives, disk, diskettes, optical disks, magnetic tape, semiconductor memories such as read-only memory (ROM), etc., or any transmitting/receiving medium such as the Internet or other communication network or link, thereby making a computer program product, i.e., an article of manufacture, according to the invention. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention. While the preferred embodiment of the present invention has been illustrated in detail, it should be apparent that modifications and adaptations to that embodiment may occur to one skilled in the art without departing from the spirit or scope of the present invention as set forth in the following claims.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for extracting elements satisfying a predetermined criterion of correlation (a "categorical cluster") from a body of data, the data including a plurality of records, the records containing elements from among a set of common fields, the elements having respective values, some of the values being common to different ones of the records, the method comprising the steps of:

initializing an associated value for each of the elements of the records;

performing a computation to update the associated values based on the associated values of other elements, the computation causing the associated values to change value in a manner related to a degree of correlation; and deriving, from the updated associated values, a categorical cluster rule which identifies highly correlated elements.

2. A method as recited in claim 1, wherein the step of initializing includes initializing the associated values for all of the elements to a constant value.

3. A method as recited in claim 1, wherein the step of initializing includes initializing the associated values for all of the elements based on a probability distribution.

4. A method as recited in claim 1, wherein the step of initializing includes:
   initializing a subset of the associated values based on a first probability distribution; and
   initializing the associated values outside the subset based on a second probability distribution.

5. A method as recited in claim 1, wherein the step of initializing includes:
   initializing a subset of the associated values based on a first probability distribution; and
   initializing the associated values outside the subset to a constant value.

6. A method as recited in claim 1, wherein the step of performing a computation is performed a plurality of times, iteratively.

7. A method as recited in claim 1, wherein the step of performing a computation includes:
   computing weights for the elements, the weight for each given one of the elements being based on the associated values of other elements contained within the records containing the given element; and
   updating the associated values based on the weights.

8. A method as recited in claim 7, wherein the step of computing weights includes, for each given one of the elements, computing an additive weight based on a sum of associated values of other elements contained within records which contain the given element.

9. A method as recited in claim 7, wherein the step of computing weights includes, for each given one of the elements, computing a multiplicative weight based on a product of associated values of other elements contained within records which contain the given element.

10. A method as recited in claim 7, wherein the step of performing a computation further includes one of:
    (i) adding a pre-set additive amount to the associated values; and
    (ii) scaling the associated values by a pre-set multiplicative amount.

11. A method as recited in claim 1, wherein the step of deriving includes providing, as an output, the associated values.

12. A method as recited in claim 11, wherein the step of deriving further includes providing, as an output, a subset of the associated values which meet a predetermined criterion.

13. A method as recited in claim 12, wherein, in the step of providing, as an output, a subset of the associated values which meet a predetermined criterion, the predetermined criterion is one of (i) a predetermined number of the largest values, and (ii) the values that exceed a predetermined threshold value.

14. A method as recited in claim 12, wherein, in the step of providing, as an output, a subset of the associated values which meet a predetermined criterion, the predetermined criterion is one of (i) a predetermined number of values having the largest additive weight, (ii) values whose additive weights exceed a predetermined value, (iii) the largest multiplicative weigh, and (iv) values whose multiplicative weights exceed a predetermined value.

15. A method as recited in claim 12, wherein the step of deriving further includes:
    identifying, from the subset of associated values which meet the predetermined criterion, a set of database records having elements whose associated values meet the predetermined criterion; and
    providing, as an output, the subset of database records, the subset of database records being the categorical cluster.

16. A system for extracting elements satisfying a predetermined criterion of correlation (a "categorical cluster") from a body of data, the data including a plurality of records, the records containing elements from among a set of common fields, the elements having respective values, some of the values being common to different ones of the records, the system comprising:
    means for initializing an associated value for each of the elements of the records;
    means for performing a computation to update the associated values based on the associated values of other elements, the computation causing the associated values to change value in a manner related to a degree of correlation; and
    means for deriving, from the updated associated values, a categorical cluster rule which identifies highly correlated elements.

17. A system as recited in claim 16, wherein the means for initializing includes means for initializing the associated values for all of the elements to a constant value.

18. A system as recited in claim 16, wherein the means for initializing includes means for initializing the associated values for all of the elements based on a probability distribution.

19. A system as recited in claim 16, wherein the means for initializing includes:
    means for initializing a subset of the associated values based on a first probability distribution; and
    means for initializing the associated values outside the subset based on a second probability distribution.

20. A system as recited in claim 16, wherein the means for initializing includes:
    means for initializing a subset of the associated values based on a first probability distribution; and
    means for initializing the associated values outside the subset to a constant value.

21. A system as recited in claim 16, wherein the means for performing a computation is operative a plurality of times, iteratively.

22. A system as recited in claim 16, wherein the means for performing a computation includes:
    means for computing weights for the elements, the weight for each given one of the elements being based on the associated values of other elements contained within the records containing the given element; and
    means for updating the associated values based on the weights.

23. A system as recited in claim 22, wherein the means for computing weights includes means, operable for each given one of the elements, for computing an additive weight based on a sum of associated values of other elements contained within records which contain the given element.

24. A system as recited in claim 22, wherein the means for computing weights includes means, operable for each given one of the elements, for computing a multiplicative weight based on a product of associated values of other elements contained within records which contain the given element.

25. A system as recited in claim 22, wherein the means for performing a computation further includes means for one of:
    (i) adding a pre-set additive amount to the associated values; and
    (ii) scaling the associated values by a pre-set multiplicative amount.

26. A system as recited in claim 16, wherein the means for deriving includes means for providing, as an output, the associated values.

27. A system as recited in claim 26, wherein the means for deriving further includes means for providing, as an output, a subset of the associated values which meet a predetermined criterion.

28. A system as recited in claim 27, wherein, in the means for providing, as an output, a subset of the associated values which meet a predetermined criterion, the predetermined criterion is one of (i) a predetermined number of the largest values, and (ii) the values that exceed a predetermined threshold value.

29. A system as recited in claim 27, wherein, in the means for providing, as an output, a subset of the associated values which meet a predetermined criterion, the predetermined criterion is one of (i) a predetermined number of values having the largest additive weight, (ii) values whose additive weights exceed a predetermined value, (iii) the largest multiplicative weigh, and (iv) values whose multiplicative weights exceed a predetermined value.

30. A system as recited in claim 27, wherein the means for deriving further includes:
means for identifying, from the subset of associated values which meet the predetermined criterion, a set of database records having elements whose associated values meet the predetermined criterion; and
means for providing, as an output, the subset of database records, the subset of database records being the categorical cluster.

31. A computer program product, for use with a computer system, for extracting elements satisfying a predetermined criterion of correlation (a "categorical cluster") from a body of data, the data including a plurality of records, the records containing elements from among a set of common fields, the elements having respective values, some of the values being common to different ones of the records, the computer program product comprising:
a computer-usable medium;
means, provided on the medium, for directing the computer system to initialize an associated value for each of the elements of the records;
means, provided on the medium, for directing the computer system to perform a computation to update the associated values based on the associated values of other elements, the computation causing the associated values to change value in a manner related to a degree of correlation; and
means, provided on the medium, for directing the computer system to derive, from the updated associated values, a categorical cluster rule which identifies highly correlated elements.

32. A computer program product as recited in claim 31, wherein the means for directing to initialize includes means, provided on the medium, for directing the computer system to initialize the associated values for all of the elements to a constant value.

33. A computer program product as recited in claim 31, wherein the means for directing to initialize includes means, provided on the medium, for directing the computer system to initialize the associated values for all of the elements based on a probability distribution.

34. A computer program product as recited in claim 31, wherein the means for directing to initialize includes:
means, provided on the medium, for directing the computer system to initialize a subset of the associated values based on a first probability distribution; and means, provided on the medium, for directing the computer system to initialize the associated values outside the subset based on a second probability distribution.

35. A computer program product as recited in claim 31, wherein the means for directing to initialize includes:
means, provided on the medium, for directing the computer system to initialize a subset of the associated values based on a first probability distribution; and
means, provided on the medium, for directing the computer system to initialize the associated values outside the subset to a constant value.

36. A computer program product as recited in claim 31, wherein the means for directing to perform a computation is operable a plurality of times, iteratively.

37. A computer program product as recited in claim 31, wherein the means for directing to perform a computation includes:
means, provided on the medium, for directing the computer system to compute weights for the elements, the weight for each given one of the elements being based on the associated values of other elements contained within the records containing the given element; and
means, provided on the medium, for directing the computer system to update the associated values based on the weights.

38. A computer program product as recited in claim 37, wherein the means for directing to compute weights includes means, provided on the medium, operable for each given one of the elements, for directing the computer system to computing an additive weight based on a sum of associated values of other elements contained within records which contain the given element.

39. A computer program product as recited in claim 37, wherein the means for directing to compute weights includes means, provided on the medium, operable for each given one of the elements, for directing the computer system to compute a multiplicative weight based on a product of associated values of other elements contained within records which contain the given element.

40. A computer program product as recited in claim 37, wherein the means for directing to perform a computation further includes means, provided on the medium, for directing the computer system to one of:
(i) add a pre-set additive amount to the associated values; and
(ii) scale the associated values by a pre-set multiplicative amount.

41. A computer program product as recited in claim 31, wherein the means for directing to derive includes means, provided on the medium, for directing the computer system to provide, as an output, the associated values.

42. A computer program product as recited in claim 41, wherein the means for directing to derive further includes means, provided on the medium, for directing the computer system to provide, as an output, a subset of the associated values which meet a predetermined criterion.

43. A computer program product as recited in claim 42, wherein, in the means for directing to provide, as an output, a subset of the associated values which meet a predetermined criterion, the predetermined criterion is one of (i) a predetermined number of the largest values, and (ii) the values that exceed a predetermined threshold value.

44. A computer program product as recited in claim 42, wherein, in the means for directing to provide, as an output, a subset of the associated values which meet a predetermined criterion, the predetermined criterion is one of (i) a predetermined number of values having the largest additive weight, (ii) values whose additive weights exceed a predetermined value, (iii) the largest multiplicative weigh, and (iv) values whose multiplicative weights exceed a predetermined value.

45. A computer program product as recited in claim 42, wherein the means for directing to derive further includes:

means, provided on the medium, for directing the computer system to identify, from the subset of associated values which meet the predetermined criterion, a set of database records having elements whose associated values meet the predetermined criterion; and means, provided on the medium, for directing the computer system to provide, as an output, the subset of database records, the subset of database records being the categorical cluster.

* * * * *